United States Patent [19]

Heldenbrand et al.

[11] 3,926,428
[45] Dec. 16, 1975

[54] SHEET FEEDING APPARATUS

[75] Inventors: Stanley W. Heldenbrand; David L. Johnson, both of Dallas; Neil H. Mote, Richardson, all of Tex.

[73] Assignee: Seaco Computer-Display Incorporated, Garland, Tex.

[22] Filed: Sept. 28, 1973

[21] Appl. No.: 401,820

Related U.S. Application Data

[62] Division of Ser. No. 166,953, July 28, 1971, Pat. No. 3,811,769.

[52] U.S. Cl. ............ 271/109; 271/145; 271/208; 271/DIG. 3
[51] Int. Cl.² .................. B65H 1/02; B65H 3/06
[58] Field of Search .......... 271/10, 208, 18.1, 18.2, 271/121, 124, 109, 167, 169, 170, 145, 8, 193, 37

[56] References Cited
UNITED STATES PATENTS

| | | |
|---|---|---|
| 2,576,882 | 11/1951 | Poole et al. ................ 271/193 UX |
| 2,995,366 | 8/1961 | Maidment .................... 271/208 |
| 3,588,094 | 6/1971 | Bost ............................ 271/121 |
| 3,640,524 | 2/1972 | Fredrickson ................ 271/121 |
| 3,709,492 | 1/1973 | Baker et al. ............ 271/208 UX |

Primary Examiner—Richard A. Schacher
Assistant Examiner—Bruce H. Stoner, Jr.
Attorney, Agent, or Firm—Kenneth R. Glaser

[57] ABSTRACT

Sheet feeding apparatus for feeding individual sheets from a stack of conductively coated copy paper through copier apparatus includes a storage tray having an angled deflector portion electrically insulated from the stack, the deflector having an electrically conductive coating for engaging and electrostatically discharging each sheet of copy paper as it is fed from the stack.

1 Claim, 4 Drawing Figures

SHEET FEEDING APPARATUS

This is a division, of application Ser. No. 166,953, filed July 28, 1971, now U.S. Pat. No. 3,811,769.

BACKGROUND OF THE INVENTION

The present invention relates to improvements in copier systems, and more particularly, to improvements in sheet feeding apparatus utilized in such systems.

As is well known, the steadily increasing growth of industry and government in recent years, and the corresponding increase in information available and generated by same, has required an enormous increase in the number and variety of records and reports that must be made, maintained, disseminated, and kept available for use and subsequent copying. One method that has evolved to handle these increased demands is generally known as a microfilm data processing. Generally, microfilm data processing comprises: (1) copying onto film, normally microfiche type microfilm, microimages of the original data, drawings, documents, memoranda, reports or other records to be stored; (2) storing the microfilm; (3) projecting and enlarging the microimages on a viewing screen to allow examination and retrieval of the information contained therein; and (4) producing, upon demand, hard copies of the information thereon.

Retrieval of the images contained on the microfiche has been provided by apparatus which has been utilized not only to view, but also to reproduce enlarged hard copies of, these microimages. One system which adapts well to this reproduction utilizes an electrostatic printing process. This process utilizes a recording medium or copy material which can comprise a base sheet, such as paper, of relatively poor electrical conductivity, which sheet is coated on at least one side with a photoconductive material such as zinc oxide suspended in an electrically insulating film forming vehicle. Normally, plurality of sheets of the so specially treated copy material or recording medium are stored in a stack, and are initially fed therefrom by handling means to an electrostatic charger for charging the photoconductive surface. Thereafter, the sheets are transported to the exposure station where, held in place, they are exposed to the light image representing the selected microimage to produce the corresponding latent image thereupon. The paper is thereafter transported to a developing station where the latent image is made visible, and then ejected from the apparatus as the final hard copy printout. Thus, the image which is viewed at the screen can be reproduced in permanent form.

Although electrostatic copier or viewer-copier devices of the type described above have served the purpose for which they were intended, they have not proved entirely satisfactory under all conditions of service for the reasons that considerable difficulty has been experienced in many areas which have detracted from the efficiency and quality of performance of these conventional systems.

One specific area in which difficulty has been encountered is in the separation of individual sheets from the stack in which the sheets are stored. This difficulty is due to the fact that the sheets of paper tend to stick together due to frictional and electrostatic forces between the adjacent sheets. This problem is especially present when individual sheets are simultaneously in contact with both the electrostatic charger and the stack from which the sheet is being fed. This common connection between the charging apparatus and the stack and the fact that the paper is coated with a conductive material results in a path being formed through which the electrostatic charge is transferred to the stack of individual sheets by the electrostatic charger apparatus. This charging of the stack increases the electrostatic forces between the adjacent sheets in the stack and, when considered in combination with the frictional forces present, there is a tendency for the sheets to stick together during the feeding operation. This may result in more than one sheet being fed through the copying cycle, and can result in jamming of the apparatus.

To reduce this problem, it has been proposed to position the electrostatic charging apparatus a sufficient distance away from the storage stack so that during feeding, the sheets will not be in contact with both the stack and the electrostatic charger. Although this configuration reduces the electrostatic charge in the stack, it fails to solve the problem of frictional forces between the adjacent sheets, increases the size of the apparatus and increases the amount of time required to produce a copy due to the increased distance the copy sheet must travel during the copying operation. It can be readily appreciated that the increased time in producing copies is a substantial disadvantage and that copies produced quickly and of good quality are desirable.

OBJECTS OF THE INVENTION

It is therefore a general object of the present invention to provide improvements to viewer-copier apparatus, and particularly to such apparatus employing electrostatic reproduction.

A still further object of the present invention is the provision of improved sheet feeding means for copier apparatus.

Yet another object of the present invention is the provision of an improved feeding means for a copier apparatus which effectively feeds individual sheets of material from a stack of a plurality of sheets.

Other objects and many of the attendant advantages of this invention will be readily appreciated by those of ordinary skill in the art as the same become better understood by reference to the following detailed description when considered in connection with the accompanying drawings in which:

DETAILED DESCRIPTION OF THE PREFERRED EMBODIMENT

Figure 1:
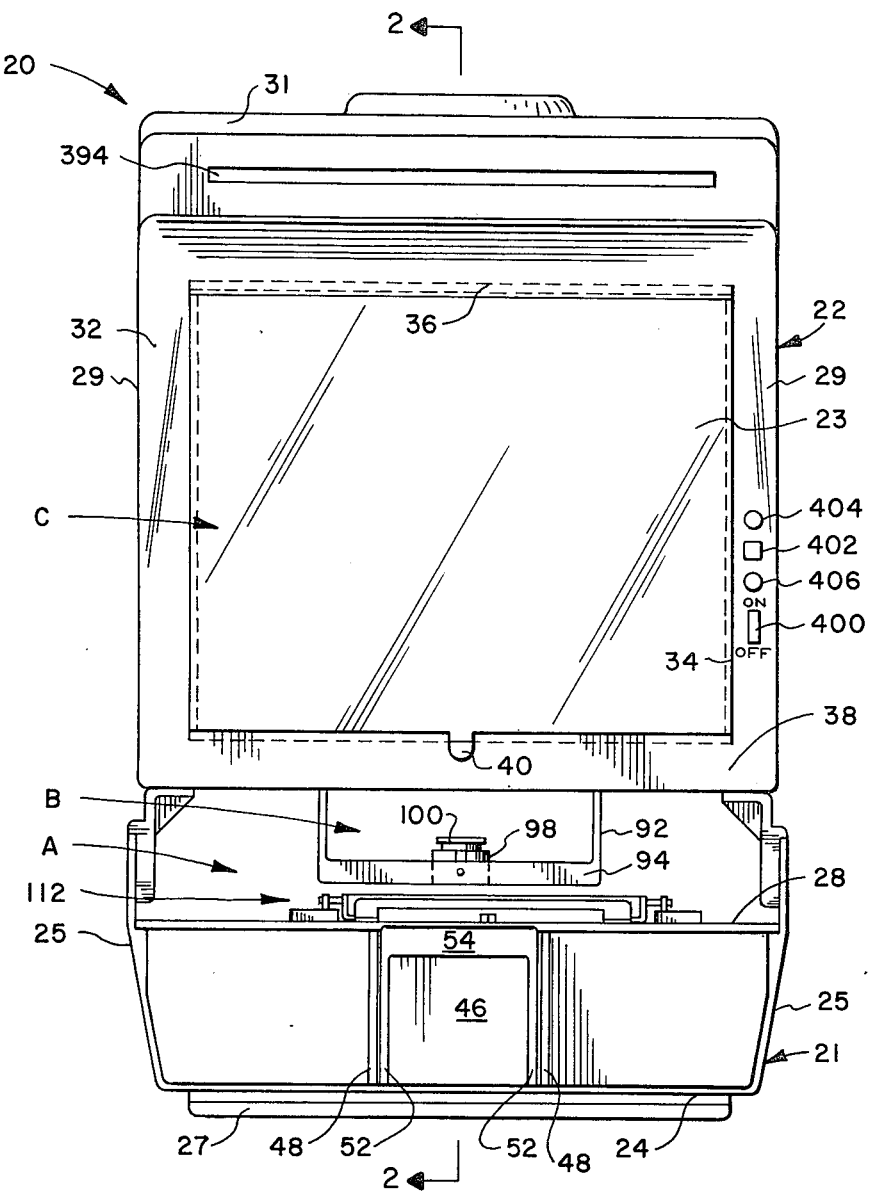
FIG. 1 illustrates a front elevation view of a viewer-copier apparatus.

Referring now to the drawings, wherein like reference characters designate like or corresponding parts throughout the several views, there is shown in FIG. 1 viewer-copier apparatus which for purposes of the description is generally designated by reference numeral 20. Throughout the following description, the front of the apparatus (see FIG. 1) is regarded as that portion which the operator faces while placing a microfiche film in the machine for reproduction and upon which the several manual operating controls are located. The apparatus 20 is illustrated in FIG. 1 in a position resting on a table or desk top.

Figure 2:
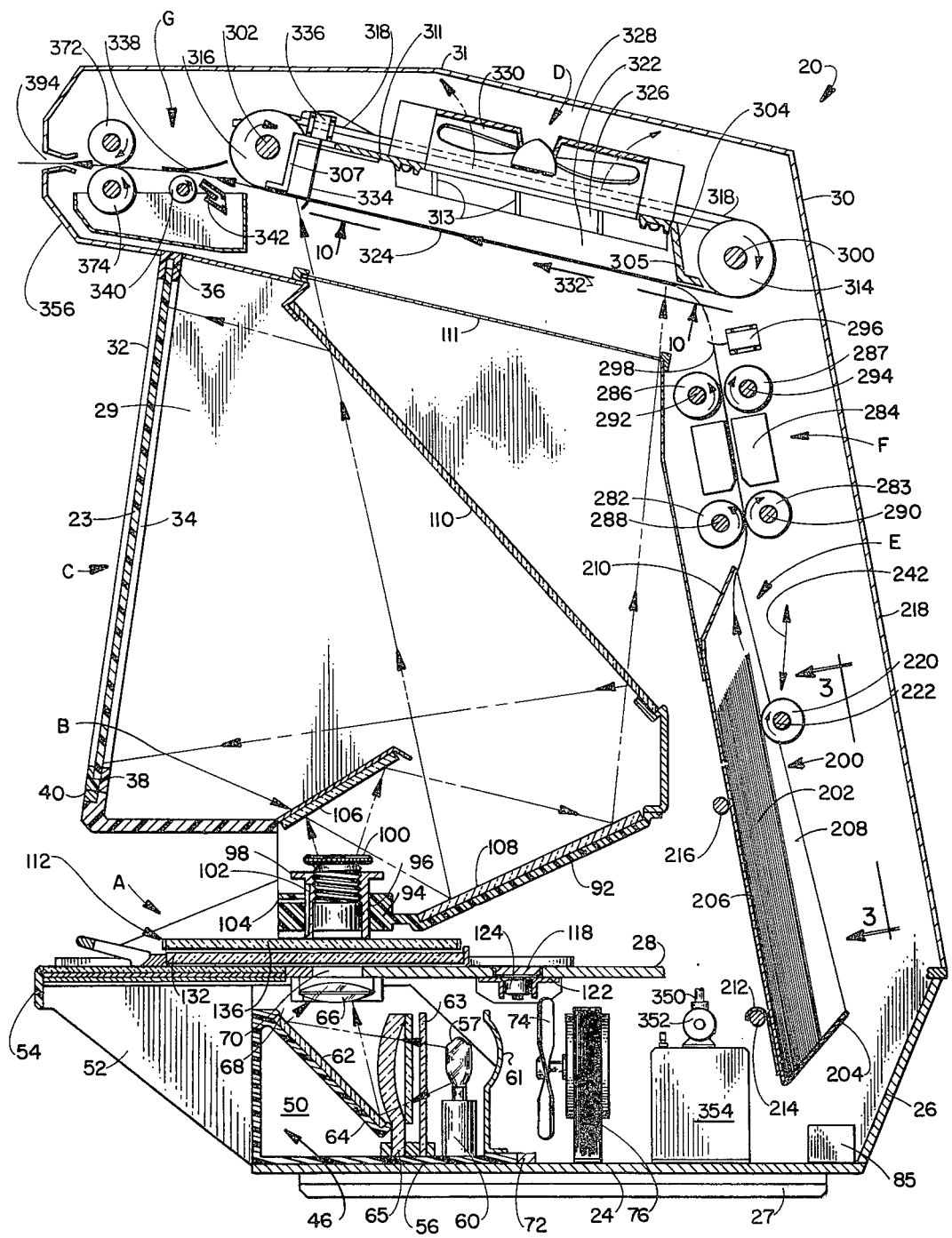
FIG. 2 illustrates a section of the device taken on line 2—2 of FIG. 1, looking in the direction of the arrows, showing the optical path and the various apparatus for handling the copy sheets.

The viewer-copier apparatus 20 is of the type which cannot only transform and project the image on microfilm to one viewable by the unaided eye, but can also reproduce or print that image on "hard copy" format. Accordingly, as can be seen in FIGS. 1 and 2, the viewer-copier apparatus 20 includes a portion A for holding a microfiche film and selecting a particular image thereof, an optical assembly B for projecting an image from the microfiche film onto a viewing portion C, and an exposure station D where previously treated sheets of copy paper are exposed to the generated image which is to be copied. The apparatus additionally has a paper storage portion E from which individual sheets are fed through an electrostatic charging portion F and to the exposure station D. Thereafter, the so exposed copy paper is transported from the exposure station D to developer apparatus G and is then ejected from the apparatus 20 as a complete enlarged hard copy printout of the selected microimage. The specific details of all of the apparatus 20 is not critical to the present invention, it being sufficient to note that the apparatus can be of the type described in U.S. Pat. No. 3,811,769.

Figure 3:
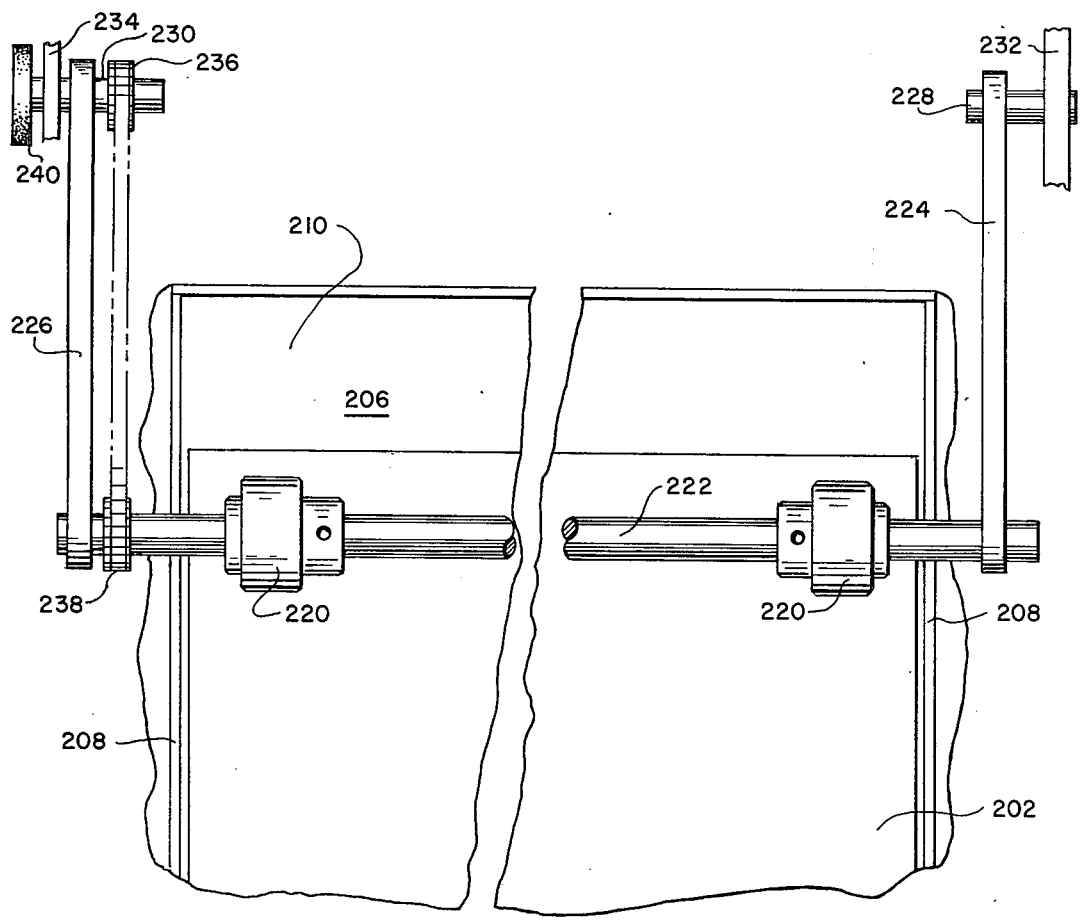
FIG. 3 illustrates a fragmented view of a portion of the apparatus depicted in FIG. 2 looking in the direction of the arrows represented by 3—3, showing the copy paper tray and feed rollers.
Figure 4:
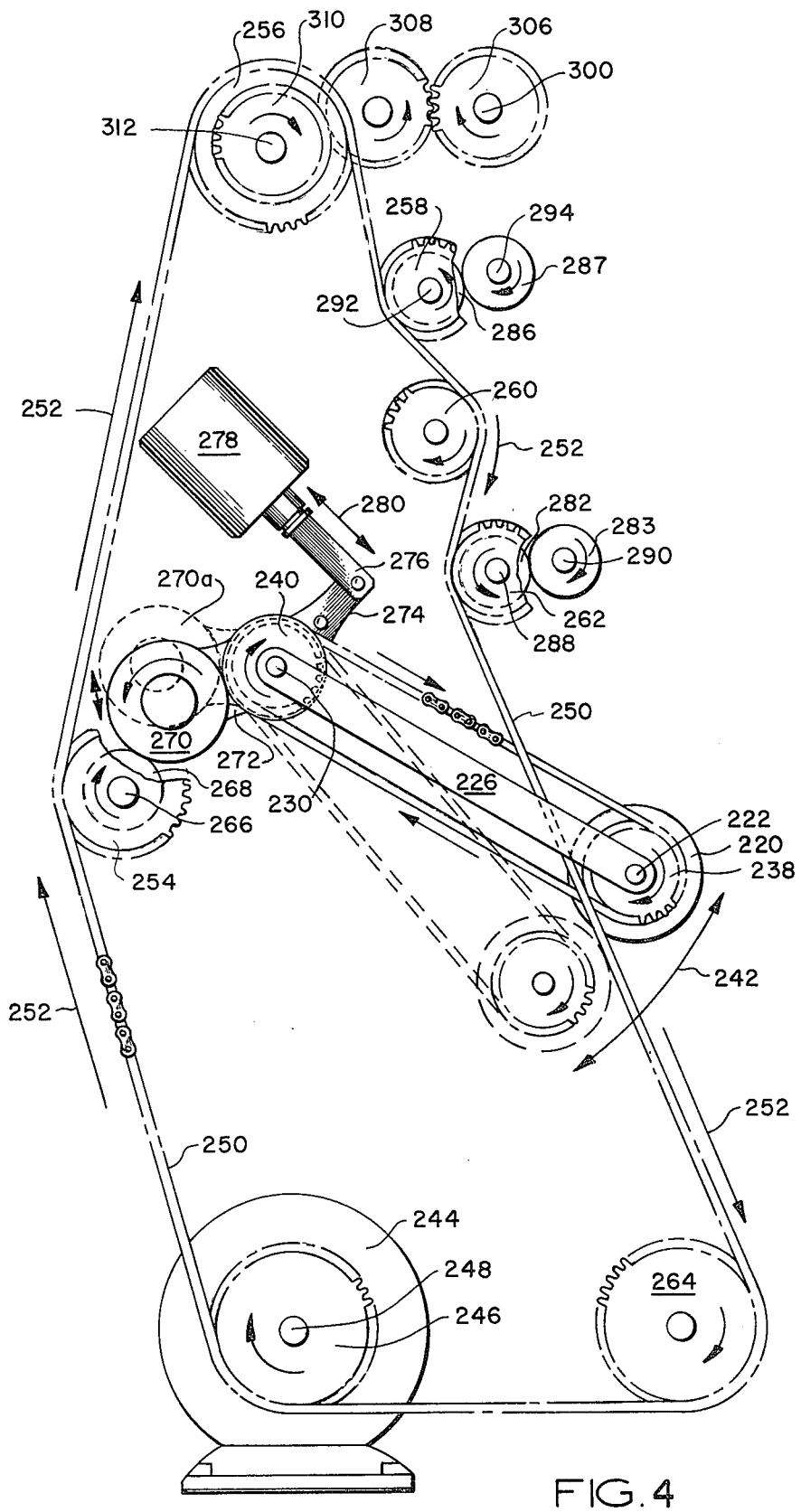
FIG. 4 illustrates a diagrammatic view of a portion of the apparatus, showing the drive mechanism thereof.

Referring now to FIGS. 2-4, the details of the improved sheet feeding portion of the apparatus 20 will now be described. Adjacent the rear of the apparatus 20 is a paper tray 200 in which a stack 202 containing a plurality of sheets of copy paper can be stored. These sheets of copy paper have an appropriate photosensitive conductive coating on one side thereof, and are placed in the tray with the so-coated side facing down and to the front. As subsequently described, individual sheets of the copy paper or recording medium are fed from the stack 202 to enter the charging apparatus F.

In accordance with a specific feature of the invention, the tray 200 (FIGS. 2 and 3) is constructed with a bottom wall 204, which extends from and is attached to a front wall 206, a pair of side walls 208; and an upper deflector wall 210, the walls of the tray preferably formed of electrically conductive material. The front wall 206 and bottom wall 204 are joined at an acute angle so that the cross-section of the stack of the paper contained in the tray will assume a parallelogram shape. The inside surfaces of the walls 204, 206, and 208 adjacent the stack 202 are coated or covered with an insulating material so that the stack is electrically insulated from the tray 200 itself. The upward deflector wall 210, on the contrary, remains uncoated with an insulating material and, in fact, can be coated on its inside surface with a high conductivity material, such as chrome, to further improve the electrical contact between the paper and the deflector wall 210.

As can be seen in FIG. 2, the paper while stored in the stack 202, is normally not in contact with the upper deflector wall 210. Paper tray 200 is supported in the apparatus 20 by means of a mounting hook 212 fastened to the exterior side of the front wall 206, which engages a hanger rod 214, while the rear of the front wall 206 rests against a second hanger rod 216. In this manner the paper tray 200 is removably mounted in the apparatus 20 so that tray 200 can be removed and filled with copy paper. An access door 218 provided in the back wall 30 can be mounted with suitable hinging and locking means to prevent the entrance of light into the apparatus when the door is in the closed position. By utilizing this door 218, access can be gained to the paper tray 200, with the access door being of a size to allow the removal of the paper tray 200 therethrough.

It also should be pointed out that hanger rods 214 and 216 are electrically grounded in the apparatus and the mounting hook 212 constructed from conductive material so that the upper deflector wall 210 (and walls 204, 206, and 208) are electrically grounded through said hanger rods 214 and 216.

A paper feed apparatus is located adjacent to paper tray 200 to transport individual sheets of copy paper from the paper tray 200 to the paper charging apparatus F mounted just above the paper tray 200. This feed apparatus comprises a pair of friction engaging wheels 220 which can be seen in FIGS. 2 and 3 as being supported on and fixed to rotate with the shaft 222. As will be hereinafter described, the shaft 222 and friction wheels 220 can be selectively driven in a clockwise direction as seen in FIG. 2 and urged in a direction to contact the surface of the upper sheet of copy paper in the stack 202. Thus, when it is desired to feed a sheet of copy paper from the stack 202, the rotating friction wheels 220 which so engage the stack, force the top sheet thereof in a direction toward the upper deflector wall 210. This deflector wall 210 is multipurpose in that it not only bends and directs the transported sheet in a direction toward the charging apparatus F, but also contacts the conductive underside of the sheet material, and due to its conductive nature, serves to discharge any electrostatic charge either carried by the sheet material itself or transferred through the sheet material after the sheet material is in contact with the charging apparatus F. This discharging function is particularly important since the charging apparatus is so disposed with respect to the tray 200 that copy paper being transported through the copy cycle will be in simultaneous engagement with the tray stack and the charging apparatus. The deflector 210 also provides the additional function of applying a frictional force to any adjacent sheet or sheets of copy paper which may adhere to the sheet being selectively fed from the stack as well as also grounding these adjacent sheets to further reduce sticking and double feeding of the sheets of copy material due to frictional and electrostatic forces which may exist between the adjacent sheets.

The means for selectively driving friction wheels 220 and shaft 222 is illustrated in FIGS. 3 and 4. The ends of the shaft 222 are rotatably mounted by suitable means such as bearings on swinging arms 224 and 226. These swinging arms 224 and 226 are in turn mounted to rotate about coaxial shafts 228 and 230 respectively. The shaft 228 is in turn rotatably supported from a frame member 232 attached to the interior of the apparatus 20 and extending parallel to the side walls 25. The shaft 230 is likewise rotatably mounted and supported from a frame member 234 which is fixed within the apparatus 20 in a position parallel to the side walls 25. A sprocket member 236 is also attached to the shaft 230 on the side of the swinging arm 226 opposite the frame member 234. This sprocket member 236 is fixed to rotate with the shaft 230 and is provided with suitable means for engaging an endless chain or belt as will hereinafter be described. Another sprocket member 238 is attached to rotate with the shaft 222 and is aligned in a parallel relationship with sprocket 236. This sprocket 238 is of similar configuration with the sprocket 236 so that the two sprockets can operate together to engage an endless chain or belt so that shaft 222 is mechanically connected to and rotatably driven by shaft 230. Also attached to shaft 230 on the opposite side of the frame member 234 from the swinging arm 236 is a friction gear 240, the function and operation of which will be hereinafter described. From the foregoing it can be seen that the swinging arms 224 and 226 will carry the shaft 222 and friction wheels 220 and will rotate respectively about shafts 228 and 230 in the direction of arrow 242 shown in FIGs. 2 and 4 between the positions shown in solid lines and in phantom lines in FIG. 4. It also can be seen that due to the offset of the shafts 228 and 230 from the friction wheels 220, the force of gravity will keep the friction wheels in contact with the upper sheet of the stack 202. This allows the apparatus to contact and feed the top sheet from the stack 202 as the number of sheets in the stack varies.

Referring here to FIG. 4, it can be seen that the drive mechanism of the apparatus 20 comprises a motor 244 which is selectively controlled by control means 85. This motor drives the sprocket 246 attached to its output shaft 248 in a clockwise direction as shown in FIG. 4 to move the endless chain or belt 250 in the direction of the arrows 252 shown in FIG. 4. This endless chain or belt 250 engages a plurality of sprockets 254, 256, 258, 260, 262, and 264 so that the motor 244 drives the above sprockets in the direction shown by the respective arrows thereon in FIG. 4. The sprocket 254 is mounted to rotate about a shaft 266 along with friction gear 268 which is selectively engaged by a movable friction idler gear 270. This idler gear 270 is rotatably mounted by a bracket 272 which is in turn mounted to rotate about shaft 230. This movable bracket 272 has an extending arm 274 to which is pivotably attached the output plunger 276 of a solenoid 278. This solenoid 278 is electrically operatable to selectively move the output plunger 276 in the direction of arrows 280 in FIG. 4 thus moving the idler gear 270 from the position shown in solid line to the position 270a shown in dotted line in FIG. 4. It is to be noted that as the idler gear 270 is moved by the action of the solenoid 278, the gerar 270 will remain continuously in contact with the friction gear 240 and will selectively engage the friction gear 268. In this manner the idler gear 270 is selectively driven by the continuously running or moving gear 268. It also can be seen that when it is desired to feed a sheet of copy material from the stack 202 that the idler gear 270 is moved into contact with gear 268 which in turn drives gear 240 which in turn drives shaft 230 which in turn drives shaft 222 and which in turn drives friction wheels 220 against the surface of the upper sheet of paper contained in the stack 202. Once the sheet is fed a sufficient distance, the solenoid 278 can move the idler gear 270 away from friction gear 268 to disengage the apparatus and discontinue the feeding operation.

The foregoing description relates to one specific embodiment of short feeding apparatus in accordance with the principles of the present invention. It is obvious, of course, that various modifications are contemplated and may be resorted to by those of ordinary skill in the art without departing from the spirit and scope of the invention as hereinafter defined by the appended claims.

What is claimed and desired to be secured by Letters Patent is:

1. Apparatus for feeding individual sheets of paper of the type having an electrically conductive coating on one side thereof from a stack of such paper, said apparatus comprising:
   a. tray means supporting and containing said stack and including a base, rear wall, and side walls,
   b. said rear wall being inclined at an acute angle with respect to said base, thereby to position the top sheet of said stack forwardly from the remainder of said stack,
   c. roller means for frictionally engaging the top sheet of said stack and urging said top sheet in a forward direction away from said rear wall and parallel to the plane of said stack,
   d. deflector means intersecting said base at an obtuse angle thereto and forward of said roller means, said deflector means having an electrically conductive portion adapted to be engaged by the conductively coated side of said top sheet when it is urged in said forward direction for discharging electrostatic charges on said coated side of said top sheet, said electrically conductive portion being sufficiently forwardly spaced from said stack to be out of physical contact with any of the sheets of said stack prior to said urging,
   e. means electrically grounding said electrically conductive portion, and
   f. electrically insulating material disposed on the inside surfaces of said tray electrically isolating said electrically conductive portion of said deflector means from said stack.

\* \* \* \* \*